United States Patent [19]
Baxter et al.

[11] Patent Number: 6,120,638
[45] Date of Patent: *Sep. 19, 2000

[54] DISPERSIBLE, HIGH SPEED BOOK CASING-IN VINYL ESTER/(METH) ACRYLATE ADHESIVE

[75] Inventors: Steven Michael Baxter; Bradley Anson Jacobs, both of Chalfont, Pa.

[73] Assignee: Rohm and Haas Company, Phila, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/931,842

[22] Filed: Sep. 17, 1997

Related U.S. Application Data

[63] Continuation of application No. 08/591,364, Jan. 25, 1996, abandoned.

[51] Int. Cl.[7] ............................................. C09J 7/00
[52] U.S. Cl. .................... 156/313; 412/5; 526/329.5; 524/832; 524/833
[58] Field of Search .................. 415/5; 524/832, 524/833; 526/329.5; 156/313

[56] References Cited

U.S. PATENT DOCUMENTS

| | | | |
|---|---|---|---|
| 2,577,568 | 12/1951 | De Florez et al. | 412/8 |
| 3,668,170 | 6/1972 | Maruta et al. | |
| 3,708,388 | 1/1973 | Lindermann et al. | |
| 3,755,237 | 8/1973 | Isaacs et al. | |
| 4,018,732 | 4/1977 | Lakshmanan | |
| 4,020,029 | 4/1977 | Gorbunow | |
| 4,316,830 | 2/1982 | Mallon | |
| 4,322,322 | 3/1982 | Lambrechts et al. | 524/832 |
| 4,322,516 | 3/1982 | Wiest et al. | |
| 4,617,343 | 10/1986 | Walker et al. | |
| 5,008,329 | 4/1991 | Abe et al. | 524/833 |
| 5,376,703 | 12/1994 | Noelken et al. | 524/833 |
| 5,532,300 | 7/1996 | Koubek et al. | 524/833 |

FOREIGN PATENT DOCUMENTS

| | | | |
|---|---|---|---|
| 1141895 | 2/1983 | Canada. | |
| 1274644 | 9/1990 | Canada. | |
| 2085206 | 6/1993 | Canada. | |
| 358907 | 7/1989 | European Pat. Off.. | |
| 50548 | 10/1980 | France. | |
| 57-08748 | 5/1982 | Japan. | |
| 57-14756 | 9/1982 | Japan. | |
| 1144152 | 3/1969 | United Kingdom | 524/832 |
| 1383494 | 2/1975 | United Kingdom | 524/832 |

OTHER PUBLICATIONS

Handbook of Adhesives, Third Edition, Irving Skeist, Ph.D., Skeist, Inc., Whippany, NJ, pp. 437–449.

*Primary Examiner*—John J. Gallagher
*Attorney, Agent, or Firm*—Stephen T. Falk

[57] ABSTRACT

An improved method for forming book casing is provided through an adhesive composition. The adhesive provides surprising adhesion to both paper and plastic films with also allowing higher processing rates. Book casings produced with the adhesives are also claimed.

6 Claims, No Drawings

DISPERSIBLE, HIGH SPEED BOOK CASING-IN VINYL ESTER/(METH) ACRYLATE ADHESIVE

This is as continuation of application Ser. No. 08/591,364, filed Jan. 25, 1996, now abandoned.

In the manufacture and binding of hardcover books one of the last operations is the "casing-in" process wherein the book block is fastened into its hard cover or "case". More specifically, book covers or cases for hardbound books are comprised of a "sandwich" or laminate consisting of the cover material, a casemaking adhesive, and a cover board. The pre-formed case is then joined to the end sheets of a book block to from the completed book cover.

As described in European Patent Application 358,907, the casing-in process includes the following four basic steps:

(1) An adhesive is evenly applied to the outside of both the first and last pages ("endpapers" or "end sheets") of the book block positioned either manually or mechanically astride a flat metal, vertical plate called a "wing". The wing mechanically lifts the book block drawing it between a pair of rollers that applies the adhesive to the outer endpapers.

(2) The adhesive-coated book block is inserted into a pre-formed case in the position in which the two are to be adhered. The adhesive application operation and case forming operation are usually synchronized so the book and cover meet at their respective spines as the book is lifted through the adhesive-dispensing rollers. As the wing continues to rise, the front and back sides of the cover drape around the book block.

(3) The book block and case are pressed together so the adhesive will bond both together. Conventionally, this step is performed mechanically before the cased-in book is ejected or it may be performed manually by removing and clasping the book block-and-case unit from its wing.

(4) Casing-in is immediately followed by a separate and distinct bindery operation called "building-in", in which heat and pressure are applied to the book so it will lay flat after drying. The hard cover, or case, containing the book block is subjected to pressure and sometimes heat at its joints between a pair of metal "forming irons" which curves the cases' joint into conformity with the shape of the book block's joint.

During casing it is necessary for the adhesive to allow high speed roll application onto the substrate without slinging. As is known in the art, slinging occurs when the adhesive is thrown off of the roller onto undesired surfaces. Slinging is highly undesirable because surfaces become adhesive covered resulting in damaged product and increased downtime for cleaning. Slinging is reduced at slower application rates of the adhesive, with the corresponding penalty of productivity losses.

Therefore there is a continuing need in the art to develop improved adhesives for faster processing times for the casing-in of book bindings, particularly adhesives which reduce slinging at high rates of book production.

SUMMARY OF THE INVENTION

It is therefore the object of the present invention to provide an improved process of casing-in bound books which provides good adhesion of the end papers to the case and cover material while maintaining or increasing processing speeds during the casing-in operation.

The present invention relates to a process of forming a bound book comprising the steps of:

(a) applying an adhesive to the outside of the first and last pages of a book block;

(b) inserting the adhesives coated book block into a pre-formed case in the position in which the two are to be adhered; and (c) pressing together the book block and case so as to bond both together; wherein adhesive composition comprises;

an adhesive comprising a polymer having repeating units derived from a vinyl ester monomer and having a glass transition temperature of about −25° C. to about +15° C. and viscosity of from about 500 to about 10,000 centipoise; and applying pressure to the joint of the book to bring the abuttable portions of the joint into bonding contact to effect an attachment, and allowing the adhesive to dry. The present invention also relates to bound books prepared by the above method.

DETAILED DESCRIPTION OF THE INVENTION

The polymeric of the adhesive is made by polymerizing a monomer or a mixture of monomers to provide a polymer having repeating units derived from the monomer or the respective monomers of the mixture. The identity and relative amounts of the monomers of the mixture are selected, according to methods known in the art, so that the polymer produced by polymerizing the monomer mixture exhibits a $T_g$ in the desired range. In a more preferred embodiment of the invention the polymer $T_g$s range from −15 to 5° C.

The $T_g$ of a polymer of a proposed composition may be estimated by methods known in the art such as, for example, by calculating the weighted average of the $T_g$ values for homopolymers derived from the respective monomers $M_1$, $M_2$, ... $M_n$, of the reaction mixture, according to equation (1):

$$T_{g(copolymer)} = \sum_{i=1}^{n} w_i T_{gi} \quad (1)$$

wherein:

$T_{g(copolymer)}$ is the glass transition temperature calculated for the copolymer $w_i$ is the weight fraction of monomer $M_1$ in the copolymer $T_{gi}$ is the glass transition temperature of the homopolymer of $M_i$.

The glass transition temperature of homopolymers may be found, for example, in "Polymer Handbook", edited by J. Brandrup and E. H. Immergut, Interscience Publishers.

The polymer includes repeating units derived from a vinyl ester monomer. Suitable vinyl ester monomers include, for example, vinyl acetate, vinyl propionate, vinyl neononanoate, vinyl neodecanoate, vinyl 2-ethylhexanoate, vinyl pivalate, vinyl versatate and mixtures thereof.

In one embodiment, the polymer is a vinyl ester homopolymer, that is, a polymer wherein all the repeating units are identical to each other, having repeating units derived from a vinyl ester monomer.

In an alternative embodiment, the polymer is a vinyl ester copolymer, that is, a polymer wherein the repeating units are not identical to each other, having repeating units derived from a mixture of vinyl ester monomers.

In a third embodiment, the polymer is a vinyl ester/acrylic copolymer and includes first repeating units derived from a vinyl ester monomer and second repeating units derived from a $(C_1-C_{12})$alkyl (meth)acrylate monomer. As used herein the terminology "$(C_1-C_{12})$alkyl" denotes an alkyl substituent group having from 1 to 12 carbon atoms per group and the terminology "(meth)acrylate monomer" refers collectively to acrylate monomers and methacrylate monomers. Suitable $(C_1-C_{12})$alkyl (meth)acrylate monomers include, for example, ethyl acrylate, butyl acrylate, 2-ethylhexyl acrylate, lauryl acrylate, methyl methacrylate, ethyl methacrylate, butyl methacrylate, isodecyl methacrylate, lauryl methacrylate and mixtures thereof. Preferably, the alkyl (meth)acrylate monomer is butyl acrylate or 2-ethylhexyl acrylate.

In a preferred embodiment, the polymer is a vinyl ester/acrylic copolymer that includes about 30 weight percent (wt %) to about 70 wt %, more preferably, about 40 wt % to about 60 wt %, repeating units each derived from a vinyl ester monomer and about 30 wt % to about 70 wt %, more preferably, about 40 wt % to about 60 wt %, repeating units each derived from a $(C_1-C_{12})$alkyl (meth)acrylate monomer.

In a highly preferred embodiment, the polymer is a vinyl ester/acrylic copolymer includes up to about 10 wt %, more preferably up to about 5 wt %, third repeating units derived from a monoethylenically unsaturated polar monomer, provided that the vinyl ester/acrylic copolymer includes no more than 3 wt %, more preferably no more than 2 wt %, repeating units derived from a monoethylenically unsaturated carboxylic acid monomer. The terminology "monoethylenically unsaturated" means having a single site of ethylenic unsaturation per molecule. Suitable monoethylenically unsaturated polar monomers include, for example, $(C_1-C_8)$hydroxyalkyl (meth)acrylate monomers, wherein the terminology "$(C_1-C_8)$ hydroxyalkyl" denotes a hydroxyalkyl substituent group having from 1 to 8 carbon atoms per group, and monoethylenically unsaturated carboxylic acid monomers. Suitable hydroxyalkyl (meth)acrylate monomers include, for example, hydroxyethyl acrylate, hydroxyethyl methacrylate, hydroxybutyl acrylate, hydroxypropyl methacrylate, 1-methyl-2-hydroxyethyl methacrylate and mixtures thereof. Suitable monoethylenically unsaturated carboxylic acid monomers include, for example, acrylic acid, methacrylic acid, itaconic acid, crotonoic acid, fumaric acid and mixtures thereof.

In a preferred embodiment, the polymer vinyl ester/acrylic copolymer that includes from about 0.1 wt % to about 10 wt % third repeating units derived from a monoethylenically unsaturated polar monomer. More preferably, the vinyl ester/acrylic copolymer includes from about 0.5 wt % to about 2 wt % third repeating units derived from a monoethylenically unsaturated carboxylic acid monomer.

The vinyl ester/acrylic copolymer may, optionally, be pre-crosslinked, that is crosslinked during synthesis of the copolymer, by including a small amount, for example, about 0.01 wt % to about 5 wt %, of a polyethylenically unsaturated monomer in the monomer mixture, wherein the terminology "polyethylenically unsaturated" means having two or more sites of ethylenic unsaturation per molecule. Suitable polyethylenically unsaturated monomers include, for example, allyl (meth)acrylate, diallyl phthalate, 1,4-butylene glycol di(meth)acrylate, trimethylolpropane tri(meth)acrylate, divinyl ketone, N,N'-methylenediacrylimide, the polyallyl and polyvinyl ethers of pentaerythritol and mixtures thereof.

The polymer is made, for example, by free radical-initiated emulsion polymerization of a monomer or monomer mixture.

In a preferred embodiment, the polymer is made by an aqueous emulsion polymerization wherein a discontinuous monomer phase is dispersed in a continuous aqueous phase and polymerized in the presence of a colloidal stabilizer, for example, hydroxyethyl cellulose, carboxymethyl cellulose, poly(vinyl alcohol), partially hydrolyzed poly(vinyl alcohol), fully hydrolyzed poly(vinyl alcohol), gum arabic or a mixture thereof.

In a preferred embodiment, the monomer to be polymerized is continuously fed into the reaction vessel as the polymerization reaction progresses.

Preferably, the polymerization is carried out using from about 0.05 pbw to about 10 pbw colloidal stabilizer per 100 pbw total monomers. The terminology "total monomers" means the total amount of monomers introduced into the reaction vessel in the course of the polymerization reaction. In the preferred embodiment wherein the monomer is fed into the reaction vessel as the reaction progresses, it is preferred that the colloidal stabilizer be continuously fed into the reaction vessel.

In a highly preferred embodiment, the colloidal stabilizer is poly(vinyl alcohol), partially hydrolyzed poly(vinyl alcohol), fully hydrolyzed poly(vinyl alcohol) or a mixture thereof.

Optionally, an anionic surfactant, a nonionic surfactant or a mixture thereof may be used in addition to the colloidal stabilizer to stabilize the aqueous reaction mixture and the product emulsion. For example, up to about 5 pbw per 100 pbw total monomer charge of an anionic surfactant such as, for example, alkyl sulfates, alkyl sulfonates, alkyl phenol ethoxysulfates, monoalkyl sulfosuccinates or a mixture thereof, or up to about 10 pbw per 100 pbw total monomer charge of a nonionic surfactant such as, for example, ethoxylated alkyl phenols, poly(ethylene oxide/propylene oxide) block copolymers, ethoxylated acetylenic diols or a mixture thereof may be used in addition to the colloidal stabilizer.

The molecular weight of the polymer may, optionally, be controlled in a conventional manner using a chain transfer agent. For example, up to about 10 wt %, more preferably, up to about 0.75 wt %, based on weight of total monomer charge, of a chain transfer agent, for example, a $(C_2-C_{20})$ alkyl mercaptan such as, for example, octyl mercaptan and dodecyl mercaptan, esters of mercaptopropionic acid such as, for example, methyl-3-mercaptopropionate and butyl-3-mercaptopropionate or a mixture thereof, may be introduced into the reaction vessel during the polymerization reaction. In a preferred embodiment, the chain transfer agent is dodecyl mercaptan or methyl-3-mercaptopropionate.

In a preferred embodiment, the polymer is in the form of an aqueous emulsion that includes from about 30 wt % to about 70 wt %, more preferably about 45 wt % to about 60 wt %, polymer solids.

In a preferred embodiment, the polymer solids are in the form of particles of about 100 nanometers to about 4000 nanometers in diameter.

The polymer emulsion has a viscosity of about 500 centipoise (cP) to about 10,000 cP, preferably from about 750 cP to about 7500 cP, and more preferably from about 1,000 cP to about 5,000 cP. The viscosity of the emulsion may be conveniently measured using a Brookfield viscometer, for example, using a Brookfield Model No. LVT viscometer equipped with a #3 spindle and operated at 12 revolutions per minute.

The adhesive composition of the present application includes the above described polymer and an optional plasticizer compound.

Suitable plasticizer compounds include, for example, phthalates such as dibutyl phthalate, benzoate derivatives such as diethylene glycol dibenzoate, dipropylene glycol dibenzoate, esters of dicarboxylic acids such as esters of $(C_2-C_6)$alcohols, for example, ethanol, with adipic acid or succinic acid and low molecular weight polar organic compounds such as, for example, methanol, 1,1,1-trichloroethane.

In a preferred embodiment, the plasticizer is a mixture of diethylene glycol dibenzoate and dipropylene glycol dibenzoate.

The adhesive composition of the present invention includes about 40 wt % to about 65 wt % solids dispersed in water.

The solids of the adhesive composition include the polymer and optionally from about 0.1 parts by weight (pbw) to about 40 pbw plasticizer per 100 pbw polymer.

In a preferred embodiment, the solids of the adhesive composition include from about 40 wt % to about 99.9 wt % polymer solids and from optionally about 0.1 wt % to about 60 wt % plasticizer solids. More preferably, the solids of the adhesive composition include from about 60 wt % to about 99 wt % polymer solids and from about 1 wt % to about 40 wt % plasticizer solids.

The adhesive composition may, optionally, further include other additives known in the art such as, for example, emulsifiers, pigments, fillers, curing agents, thickeners, humectants, wetting agents, defoamers, biocides, adhesion promoters, colorants, waxes and antioxidants.

In a preferred embodiment, the adhesive composition of the present invention is made by adding the plasticizer and any other components of the adhesive composition to an aqueous emulsion of the polymer and agitating the combination to form a substantially uniform emulsion.

The plasticizer content of the adhesive composition of the present invention has an unexpectedly dramatic effect on the viscosity of the adhesive composition, that is, the viscosity of the adhesive composition made by adding a relatively small amount of plasticizer to an emulsion of the above disclosed polymer is dramatically higher, for example, a factor of 3 to 10 times higher than the initial viscosity of the emulsion. In contrast, an analogous adhesive composition based on a polymer having a $T_g$ below $-15°$ C. would be expected to exhibit a viscosity that is higher than the initial viscosity of the polymer emulsion by a factor of less than 3. The adhesive composition of the present invention provides a viscosity response factor of greater than 150 when 5 parts by weight plasticizer is employed and greater than about 300 when 10 parts by weight of plasticizer is employed.

The dramatic viscosity response of the adhesive composition of the present invention is beneficial in that the composition provides equivalent performance at a lower solids level, that is, can be applied in a state wherein the composition is more highly diluted with water, than an adhesive composition based on an analogous polymer having a $T_g$ less than $-25°$ C.

In a preferred embodiment, the adhesive composition of the present invention has a viscosity of from about 500 cP to about 10,000 cP, more preferably of from 750 cP to about 7,500 cP and most preferably, from about 1,000 cP to about 5,000 cP.

The adhesive composition of the present invention is useful for bonding substrates together. The adhesive composition is particularly useful for wet lamination of a plurality of substrate layers, that is, a bonding method wherein layer of the adhesive composition is applied to a first substrate layer, the wet adhesive layer is covered with a second substrate layer and the adhesive layer is then dried to form a laminated article wherein the two substrates are bonded together by the dried adhesive layer. In a preferred embodiment, the substrate layers are in the form of flat sheets of substrate material.

The adhesives of the present invention also have good adhesive strengths which are generally greater than 0.2 pounds per linear inch, typically greater than 0.5 and preferably greater than 0.7 pounds per linear inch.

The adhesives also provide good redispersability values. Redispersability is a measurement of the dry adhesive's ability to reabsorb water to become fluid. Redispersability is desirable because it permits the dried adhesive to be more easily cleaned off of coating equipment and other undesired surfaces with the application of water.

The adhesives also provide good setting speeds. Setting speed is a measure of the time required for the adhesive to form a substrate-destroying bond after wet lamination. Faster setting speeds are desirable because they can translate into higher rates of production.

The adhesive composition of the present invention may be applied to a substrate to be bonded by known techniques such as, for example, roll coating, wire-wound rod coating, knife coating, gravure printing and curtain coating. In casing-in applications the adhesive is typically applied by roll coating.

Suitable substrates for casing-in books include, for example, paper products such as papers and paperboards, metal films and polymer films and composite substrates, that is, substrates consisting of a combination of dissimilar substrate materials such as polymer-coated paperboards, or wax-coated paperboard.

In book casing-in applications it is particularly important for the adhesive to provide good adhesion to different substrate materials. In order to adequately bond the different substrates together, the adhesive must provide good adhesion to both substrates. For example, the adhesive may be applied to bond paper to a polymeric film. Suitable polymers include polyethylene, polypropylene, polyethylene terephthalate, polyester and the like. Leather is also employed as a material for book casings as well as synthetic materials which appear to look like leather such as Teclar®.

The adhesive composition of the present invention allows the casing-in process to occur at higher rates and with better substrate adhesion than with other adhesives used for the casing-in of books. Higher throughput is achieved through the use of the claimed adhesive because the adhesive can be applied with high output (books per minute) without slinging. Line speeds achieved with the present adhesive permits more than 40 books per minute to be bound, frequently more than 70 and preferably greater than 100 books per minute to be bound using the adhesive composition described herein, on equipment such as a Kolbus EMP 70 cycle/min or 100 cycle/min casing-in machine. Another method for describing the speed in which the adhesive can be applied is to measure the line speed at which the adhesive can be applied. The present adhesive provides a line speed of more than 100 feet per minute and preferably greater than 200 feet per minute. The line speed rates provided herein are measured on a Union Tool Coater. As noted herein, the increase in line speed with the adhesive composition is achieved without an unexceptable increase in the amount of slinging. The increase in line speed allows more books to be made per hour without adhesive slinging onto undesired surfaces, which can cause damaged books and may require stopping the process in order to clean the casing-in equipment.

The following examples are provided to be illustrative of the present invention.

EXAMPLE 1

A monomer mixture consisting of 200 g butyl acrylate, 592 g vinyl acetate, 8 g acrylic acid, 118.8 g of a 20.2 wt % solution of partially hydrolyzed poly vinyl alcohol) (Airvol 205, Air Products, Allentown, Pa.) in water and 217.2 g DI water was made.

A stirred reaction vessel containing 208.3 grams (g) deionized (DI) water and 12.0 g surfactant (ethoxylated octylphenol having 10 moles ethylene oxide per molecule, Triton X-100, Union Carbide, Danbury, Conn.) was heated to 65° C. under nitrogen. Then 0.8 g of a 1.0 wt % iron (II) sulfate solution in water, followed by 0.2 g of an aqueous 30 wt % solution of hydrogen peroxide dissolved in 2.0 g DI water, were each added to the reaction vessel.

Three separate feed streams were simultaneously introduced and concurrently fed into the reaction vessel:

the monomer mixture was fed into the reaction vessel at a substantially uniform rate over a time period of 165 minutes;

a solution of 1.6 g of 30 wt % hydrogen peroxide dissolved in 39.8 g DI water was fed into the reaction vessel at a substantially uniform rate over a time period of 180 minutes; and a solution of 0.8 g of sodium sulfoxylate formaldehyde dissolved in 421.0 g DI water was fed into the reaction vessel at a substantially uniform rate over a time period of 180 minutes.

At the completion of the monomer mixture feed stream, 12 g of DI water were added to the reaction vessel.

The contents of the reaction vessel were cooled to room temperature upon completion of the hydrogen peroxide and the sodium sulfoxylate formaldehyde feed streams.

The pH of the contents of the reaction vessel was then adjusted to a value of 3.4 using a 15 wt % solution of sodium carbonate in water and the solids content of the reaction vessel was adjusted to a nominal, that is, determined by calculation, value of 55 wt % by adding DI water to the reaction vessel.

The product emulsion so formed had a solids content of 54.6 wt % and a viscosity of 800 centipoise (measured using a Brookfield RVT viscometer equipped with a #6 spindle at 10 revolution per minute).

The $T_g$ of the copolymer of the product emulsion was estimated according to the relationship set forth above as equation (1) to be 11.2° C.

EXAMPLES 2–10

The polymer emulsions of Examples 2–10 were each made by the process described above in Example 1, except that different relative amounts of monomers were used and, in Example 10, a chain transfer agent was added to the reaction mixture to limit the molecular weight of the polymer formed by the process.

The respective glass transition temperatures of the polymers formed in Examples 3 and 6–10 were measured using a Differential Scanning Calorimeter (Model TA 2910, TA Instruments, New Castle, Del.) according to the following procedure. A polymer sample was heated from room temperature to 150° C. at a rate of 20° C. per minute (° C./min). The sample was held at 150° C. for 5 minutes and then rapidly cooled to −100° C. The sample was then reheated to 150° C. at 20° C./min while data was collected. The reported Tg is the value at half-height of the glass transition curve.

The respective $T_g$s of the polymers formed in Examples 1, 2, 4 and 5 were each estimated according to the relationship set forth above as equation (1).

The relative amounts of following monomers: butyl acrylate (BA), vinyl acetate (VAC), acrylic acid (AA), 2-ethylhexyl acrylate (EHA), methyl acrylate (MA), ethyl acrylate (EA) and isobutyl acrylate (IBA), and chain transfer agent (dodecyl mercaptan (DDM)) used to make each of the respective copolymers of Examples 1–10 are set forth below in TABLE 1.

TABLE 1

| EX # | BA | VAC | AA | EHA | MA | EA | IBA | DDM |
|---|---|---|---|---|---|---|---|---|
| 1 | 25 | 74 | 1 | 0 | 0 | 0 | 0 | 0 |
| 2 | 49.5 | 49.5 | 1 | 0 | 0 | 0 | 0 | 0 |
| 3 | 56 | 43 | 1 | 0 | 0 | 0 | 0 | 0 |
| 4 | 0 | 55 | 1 | 44 | 0 | 0 | 0 | 0 |
| 5 | 50 | 44 | 1 | 5 | 0 | 0 | 0 | 0 |
| 6 | 0 | 22 | 1 | 0 | 0 | 77 | 0 | 0 |
| 7 | 40 | 22 | 1 | 0 | 37 | 0 | 0 | 0 |
| 8 | 0 | 46 | 1 | 0 | 0 | 0 | 53 | 0 |
| 9 | 56 | 44 | 0 | 0 | 0 | 0 | 0 | 0 |
| 10 | 49.5 | 49.5 | 1 | 0 | 0 | 0 | 0 | 0.2 |

The adhesion of each of the polymer emulsions of Examples 1 to 10 to wax-coated cardboard was determined by the method disclosed below.

Cardboard (200 pounds per square inch burst strength) was coated with a wax-based coating (Coating 40E, Michelman, Inc., 9080 Shell Road, Cincinnati, Ohio) using a #6 wire-wound rod. The coated board was cured at 105° C. for 1 minute and then allowed to equilibrate in a controlled environment (25° C. and 50% relative humidity) overnight. The wax-coated cardboard was then cut into 2 inch by 4 inch coupons.

A line of polymer emulsion (about 5 g adhesive) was applied along one of the 2 inch wide ends of each of the wax-coated coupons and then drawn down the length of the coupon using a notched stainless steel blade (5 notches per inch, with each notch being about 1/32 inch wide by 1/16 inch deep). A coupon of virgin cardboard, that is, a cardboard coupon having no wax coating and having no emulsion coating, was applied to the wet emulsion-coated side of the coated coupon and a 1 kilogram weight was applied for 4 minutes to compress the combined coupons and adhesive composition. The coupons were then peeled by hand and the amount of fibers torn from the wax-coated coupon was determined visually. The adhesion values reported below in Table 2 are averages based on the fiber tear results for 10 samples.

The adhesion results obtained with the emulsions of Examples 1–10 were compared with those obtained using an emulsion of a vinyl ester/acrylic copolymer (Comparative Example C1) that is commercially available as Rovace HP-2931 copolymer emulsion from Rohm and Haas Company.

The polymer solids content, expressed as a weight percent (wt %), the viscosity, expressed in centipoise (cP), a $T_g$ value, expressed in degrees centigrade (° C.) and an adhesion value, expressed as percentage of fibers torn from the wax-coated coupon (%), are set forth below in TABLE 2 for each of the respective emulsions of Examples 1–10 and for Comparative Example C1.

TABLE 2

| Example # | Solids Content (wt %) | Viscosity (cP) | Tg (° C.) | Adhesion (%) |
|---|---|---|---|---|
| 1 | 54.6 | 700 | 11.2* | — |
| 2 | 55.1 | 910 | −9.8* | 70 |
| 3 | 55.3 | 1400 | −7 | 80 |
| 4 | 55.4 | 690 | −12.4* | 60 |
| 5 | 55.3 | 780 | −14.4* | 70 |
| 6 | 54.8 | 2990 | 0.6 | 20 |
| 7 | 54.6 | 1110 | 0 | 30 |
| 8 | 54.6 | 580 | 10 | 0 |
| 9 | 55.4 | 1000 | −6.8 | 30 |
| 10 | 54.8 | 1210 | −0.8 | 60 |
| C1** | — | 2090 | −25 | 80 |

*Tg estimated according to equation (1)
**Rovace HP-2931, Rohm and Haas Company

EXAMPLES 11–20 AND COMPARATIVE EXAMPLES C1–C3

A benzoate plasticizer (50/50 blend of diethylene glycol dibenzoate and dipropylene glycol dibenzoate, (Benzoflex 50, Velsicol, Rosemont, Ill.) was added to each of the emulsions of Examples 1–10 and C1.

The mixtures so formed were then allowed to equilibrate overnight. The viscosity of each of the mixtures was then measured with a #3 spindle and operated at 12 revolutions per minute. The effect of the plasticizer on the viscosity of each of the respective mixtures was characterized by calculating a viscosity response factor (VR) according to the relationship:

VR=100 (adhesive composition viscosity/emulsion viscosity)

for each of the respective adhesive compositions.

The polymer emulsion used (Emulsion Example #), the amount of plasticizer added to form the mixture, expressed as parts by weight plasticizer per 100 parts by weight emulsion (pbw/100 pbw emulsion), the viscosity of the emulsion/plasticizer mixture, expressed in centipoise (cP) and the viscosity response factor exhibited by the mixture is reported below in Table 3 for each of the respective emulsion/plasticizer mixtures.

TABLE 3

| Emulsion/ Plasticizer Mixture EX #/ | Emulsion EX # | Plasticizer (pbw/100 pbw emulsion) | Viscosity (cP) | Viscosity Response Factor |
|---|---|---|---|---|
| 11 | 1 | 10 | 3820 | 550 |
| 12A | 2 | 5 | 2000 | 220 |
| 12B | 2 | 10 | 4800 | 530 |
| 13A | 3 | 5 | 4000 | 290 |
| 13B | 3 | 10 | 9500 | 680 |
| 14A | 4 | 5 | 1420 | 210 |
| 14B | 4 | 10 | 3400 | 490 |
| 15 | 5 | 10 | 3650 | 470 |
| 16A | 6 | 5 | 6600 | 220 |
| 16B | 6 | 10 | 18000 | 600 |
| 17A | 7 | 5 | 3000 | 270 |
| 17B | 7 | 10 | 7310 | 660 |
| 18A | 8 | 5 | 1520 | 260 |
| 18B | 8 | 10 | 3580 | 620 |
| 19 | 9 | 10 | 6000 | 600 |
| 20A | 10 | 5 | 4250 | 350 |
| 20B | 10 | 10 | 7100 | 590 |
| C2 | C1 | 5 | 2580 | 120 |
| C3 | C1 | 10 | 4180 | 200 |

EXAMPLES 21 and 22A–22C

Examples 21 and 22A–22C. illustrate the effect of added plasticizer on adhesion.

Example 21 was an emulsion of a polymer having the same composition as that in the emulsion of Example 3 described above.

The adhesive compositions of Examples 22A–22C were made by adding plasticizer and water to samples of the emulsion of Example 21.

The viscosity and adhesion to wax coated cardboard were measured for each of the Examples 21 and 22A–22C. according to the method described above in Examples 11–20 and C1–C4.

The amount of added plasticizer, expressed as parts by weight plasticizer per 100 parts by weight emulsion (Plasticizer (pbw/100 pbw emulsion)), the amount of added water, expressed as parts by weight water per 100 parts by weight emulsion (H$_2$O (pbw per 100 pbw emulsion)), the solids content of the emulsion/plasticizer/water mixture, expressed as a percent (solids; (%)), the viscosity of the emulsion/plasticizer/water mixture, expressed in centipoise (Viscosity; (cP)) and the adhesion of the emulsion/plasticizer/water mixture to wax-coated cardboard, expressed as a percentage (Adhesion; (%)) are set forth below in TABLE 4 for Examples 21 and 22A–22C.

TABLE 4

| Example # | Plasticizer (pbw/100 pbw emulsion) | H$_2$O (pbw/ 100 pbw emulsion + plasticizer) | Solids (wt %) | Viscosity (cP) | Adhesion (%) |
|---|---|---|---|---|---|
| 21 | 0 | 0 | 56.3 | 1060 | 60 |
| 22A | 5 | 1.2 | 57.8 | 1820 | 70 |
| 22B | 10 | 3.3 | 58.4 | 2120 | 80 |
| 22C | 15 | 5.5 | 58.9 | 2430 | 80 |

EXAMPLES 23–25

An experiment was performed to determine the amount of added water required to bring the viscosity of a mixture of plasticizer and polymer emulsion back to that of the neat emulsion (this method normalizes for differences in neat viscosity of the emulsions used).

Example 23 was an emulsion of a polymer having the same composition as that in the emulsion of Example 3 described above.

Plasticizer (10 parts by weight Benzoflex 50 per 100 parts by weight emulsion) was added to a sample of the emulsion of Comparative Example C1 to form the mixture of Example C4 and to a sample of the emulsion of Example 23 to form the mixture of Example 24.

The emulsion used to form the mixture (Example #), the solids content of the emulsion used (%), the viscosity of the emulsion used, expressed in centipoise (cP), the viscosity of the mixture of emulsion and plasticizer (cP), the viscosity response factor exhibited by the mixture of emulsion and plasticizer, the amount of water added to bring the viscosity of the mixture of emulsion and plasticizer back to the viscosity of the emulsion, expressed as parts by weight water per 100 parts by weight emulsion (H$_2$O added (pbw/100 pbw emulsion)) and the viscosity of the emulsion/ plasticizer/added water mixture (cP) are each set forth below in TABLE 5 for Example 24 and Comparative Example C4.

TABLE 5

|  | Plasticizer/Emulsion Mixture Ex # C4 | Plasticizer/Emulsion Mixture Ex # 24 |
|---|---|---|
| Emulsion Example # | C1 | 23 |
| Emulsion Solids (%) | 54.8 | 55.8 |
| Emulsion Viscosity (cP) | 2950 | 870 |
| Emulsion/Plasticizer Viscosity (cp) | 5900 | 4480 |
| Viscosity Response Factor | 200 | 510 |
| H$_2$O added (pbw per 100 pbw Emulsion) | 2.1 | 5.2 |
| Emulsion/Plasticizer/H$_2$O Viscosity (cP) | 3070 | 810 |

The combination of a plasticizer and an emulsion of a polymer having repeat units derived from a vinyl ester monomer and having a T$_g$ from about −15° C. to about +15° C. provides an adhesive composition that may be more highly diluted with water than those based upon lower T$_g$ polymers, thereby reducing the amount of polymer and associated cost required to provide a high level of performance.

EXAMPLE 26

Various adhesive compositions were evaluated for their performance as adhesives in book casing-in applications.

Coatability

The coatability of the adhesives was evaluated using a Model 5C-14 direct roll coater (Union Tool Corp., Warsaw, Ind.) equipped with a 4 inch (10 centimeter) diameter rubber applicator roll (13 dorometer-type A hardness) and a 2.75 inch (7 cm) diameter chrome doctor roll. The rubber roll had a notch in the surface with approximate dimensions of 1/16 inch (0.16 cm) (deep)×½ inch (1.25 cm) (circumference)× 1.5 inch (3.81 cm) (axis) that served as a reservoir allowing a heavier coat weight of emulsion to be present in the notch than on the surface of the roll. The rolls were brought into contact such that the doctor roll lightly compresses the applicator roll. The rate of roll rotation was set at approximately 200 feet per minute as measured with a hand-held tachometer. While the rolls were rotating, enough adhesive, (approximately 0.5 pint) (approximately 275 ml) was poured into the nip between the rolls such that a constant excess of adhesive was maintained in the nip.

Coatability performance was evaluated by holding a piece of paperboard (8.5×11 inch) (21.25×28 cm) beneath the chrome doctor roll for one minute. The amount of adhesive that had slung off the roll onto the paperboard from the areas of the notch and of the unnotched surface was then rated on a scale of 1 to 5 (best). A rating of five was given if virtually no adhesive was found on the paperboard, and a rating of 1 was given for heavy coverage (greater than 50% of the paperboard surface area).

Polypropylene and Polyester Adhesion

Adhesives were applied to polypropylene (1 mil) or to polyester (1 mil) with a #18 wire wound rod. 60# lithographic paper was then married to the wet adhesive layer and laminated with firm hand pressure using a rubber roller. Laminates were dried overnight under controlled conditions (25° C., 50% relative humidity) and then bond strengths were measured on 1 inch wide strips using an Instron tester at a rate of 12 inch per minute in a T-peel configuration.

Paper tear (PT) failure is desirable, but difficult to quantify, so peak peel strengths in pounds per linear (pli) are reported if possible.

Cover Stock Adhesion

Samples of book cover stock (consisting of polypropylene or polyester films laminated to paper), as well as samples of book end paper (60–80 pound) were cut into 1 inch×3 inch strips. The film side of the coverstock was coated with adhesive using a #22 wire wound rod, and then a piece of end paper was laminated to the wet adhesive using a rubber roller with firm hand pressure. Laminates were dried overnight under controlled conditions (25° C., 50% humidity) and then bond strengths were rated qualitatively by peeling laminates by hand. Adhesive bond strengths were ranked by comparison with one another (1 is the best); more than one adhesive could receive the same ranking.

Setting Speed

Multiple sheets of Kraft paper (50–60 pound) were cut to approximately 9 inch×12 inch (22.8×30.54 cm), half are saved as base sheets, and half are then cut from one side to make six 1 inch×6 inch (2.5×15.2 cm) parallel strips still joined together on the other side. The adhesive is applied to a base sheet using a #18 wire wound rod. A top sheet with the cut strips was immediately closed to the cover sheet are quickly pulled at 2 second intervals until a bond of at least 50% fiber tear is observed. The setting speed value is recorded as an average of times for three repetitions of the test. Shorter setting times are preferred.

Redispersability

Adhesive was drawn down on a glass plate using a 3 mil Bird applicator and allowed to dry at room temperature. After 1 hour, a few drops of deionized water are placed on the adhesive film, and the area was rubbed with a finger (protected with a latex glove). The time elapsed before the adhesive redisperses or the film breaks was recorded. Shorter times are preferred. The failure mode was preferred in the following (decreasing order): r (redispersible) is preferred over s pc (some pieces) is preferred over pc (pieces) is preferred over fb (film break).

TABLE 6

| Adhesive | Time (sec) Setting Speed | 1 Hour Redisperse | Coatability | Opp Litho Adhesion | 24 Hour Dried Coverstock #22PP | #22 PET |
|---|---|---|---|---|---|---|
| Aabbitt | 4 | 5/r | 2+ | PT | 3 | 3 |
| Example 27 | 4.7 | 22/pc | 1+ | 0.8 | — | — |
| Example 28 | 4 | 12/s pc | 4+ | ~1.0/PT | 2 | 1 |
| Example 29 | 4 | 19/pc | 4− | 1.1/PT | 3 | 2 |

Aabbitt is Aabbitt adhesive 834-10-14, having a viscosity of 2500 cP commercially available adhesive for casing-in.

Example 27 is HP-2931 is a commercial vinyl acetate/acrylic/polyvinylalcohol stabilized adhesive, having a viscosity of 2900 cP, sold by the Rohm and Haas Company for use in casing-in applications.

Example 28 was made by the process described in Example 1 except that the relative amounts of monomers used was 56.5 wt % butyl acrylate, 43 wt % vinyl acetate, and 0.5 wt % acrylic acid, and the surfactant was a poly (ethylene oxide/propylene oxide) copolymer (Pluronic L64, BASF Corporation, Mount Olive, N.J.). The monomer mixture was fed into the reaction vessel at a substantially uniform rate over 130 minutes; the hydrogen peroxide and sodium sulfoxylate formaldehyde solutions were fed over a time period of 150 minutes. The resulting adhesive had a viscosity of 2300 cP and nominal solids contents content of 57 wt %.

Example 29 was made by the process described in Example 28 except Pluronic L35 was used in place of Pluronic L64. The adhesive had a viscosity of 1950 cP of 1950 cP and nominal solids content of 57 wt %.

As used in the examples these abbreviations have the following meaing:

PT shall mean paper tear.
Opp shall mean oriented polypropylene.
PP shall mean polypropylene.
Litho shall mean 60# lithography paper.
PET shall mean polyester.

This example demonstrates the unexpected improvement in the overall properties of the casing in adhesives of the present invention. The coatability of examples 3–9 were very good with very little adhesive on undesired areas. The adhesion to polypropylene and polyester is strong resulting in paper tear, the adhesives have setting speeds which are comparable to commercial casing-in adhesives while maintaining good redispersability.

We claim:

1. A method for casing-in a hardcover book comprising the steps of:
   (a) applying a redispersible adhesive to the outside of the first and last pages of a book block;
   (b) inserting the adhesives coated book block into a pre-formed case in the position in which the two are to be adhered; and
   (c) pressing together the book block and case so as to bond together; wherein the adhesive composition comprises:
      a polymer made by aqueous emulsion polymerization in the presence of a polyvinyl alcohol colloidal stabilizer, the polymer having a glass transition temperature of about −25°C. to about +15° C. and an emulsion viscosity of from about 500 to about 10,000 cP;
      the polymer consists of from about 30 weight percent to about 44 weight percent first repeating units, each derived from a vinyl ester monomer; about 55 weight percent to about 70 weight percent second repeating units, each derived from an alkyl acrylate monomer selected from the group consisting of ethyl acrylate, butyl acrylate, 2-ethylhexyl acrylate or mixtures thereof; and about 0.1 weight percent to about 10 weight percent third repeating units derived from a monoethylenically unsaturated polar monomer provided that the polymer comprises no more than about 3 weight percent repeating units derived from a monoethylenically unsaturated carboxylic acid monomer; wherein the vinyl ester monomer is selected from the group consisting of vinyl acetate, vinyl propionate, vinyl neonanoate, vinyl neodecanoate, vinyl 2-ethylhexanoate, vinyl pivalate, vinyl versatate and mixtures thereof; and
   (d) applying pressure to the joint of the book to bring the abuttable portions of the joint into bonding contact to effect an attachment, and allowing the adhesive to dry.

2. The method of claim 1, wherein the polymer comprises from about 0.5 weight percent to about 2 weight percent repeating units derived from an monoethylenically unsaturated carboxylic acid monomer.

3. The method of claim 2, wherein the monoethylenically unsaturated carboxylic acid monomer is acrylic acid.

4. The method of claim 1, wherein the colloidal stabilizer is selected from the group consisting of poly(vinyl alcohol), partially hydrolyzed polyvinyl alcohol), fully hydrolyzed poly(vinyl alcohol) and mixtures thereof.

5. The method of claim 1, wherein greater than 40 books per minute are bound.

6. The method of claim 1, wherein the line speed is greater than 100 feet per minute.

* * * * *